United States Patent

Schneider

[15] 3,651,248

[45] Mar. 21, 1972

[54] BLACK LEVEL CLAMPING BY COLOR SIGNAL DIFFERENCE GATED TO STORAGE DURING BEAM BLOCKING

[72] Inventor: Hans-Dieter Schneider, Gross-Gerau, Germany

[73] Assignee: Fernseh GmbH, Darmstadt, Germany

[22] Filed: Jan. 7, 1970

[21] Appl. No.: 1,154

[30] Foreign Application Priority Data

Jan. 11, 1969 Germany ......................P 19 01 296.5

[52] U.S. Cl. ..................178/5.4 R, 178/5.4 TC, 178/7.1 DC

[51] Int. Cl. ..........................................................H04n 5/18

[58] Field of Search......................178/5.44 TC, 5.4 R, 5.2 R

[56] References Cited

UNITED STATES PATENTS 3,126,447 3/1964 Bendell ..............................178/5.4 R 3,283,067 11/1966 Bazin et al. ......................178/5.4 TC

OTHER PUBLICATIONS

RCA TN No:295 June 1959

*Primary Examiner*—Robert L. Griffin

*Assistant Examiner*—Donald E. Stout

*Attorney*—Littlepage, Quaintance, Wray & Aisenberg

[57] ABSTRACT

A system for controlling the black level value of primary color signals by comparing the black levels of two primary signals with that of a third primary signal to generate difference signals, and gating these difference signals into respective clamping circuits for feedback control of the black level values.

10 Claims, 13 Drawing Figures

Inventor:
Hans-Dieter Schneider by
Littlepage, Quaintance, Wray & Aisenberg Attorneys Inventor:
Hans-Dieter Schneider by
Littlepage, Quaintance, Wray & Aisenberg
Attorneys Inventor:
Hans-Dieter Schneider by
Littlepage, Quaintance, Wray & Aisenberg
Attorneys

BLACK LEVEL CLAMPING BY COLOR SIGNAL DIFFERENCE GATED TO STORAGE DURING BEAM BLOCKING

BACKGROUND OF THE INVENTION

1. Field of the Invention

The invention relates to a method for regulating and/or supervising the black level of primary color signals, which are generated by a color television signal generator.

2. Brief Description of the Prior Art

In color television signal generators, in particular color television cameras, any discrepancy as between the black levels of the individual primary color signals among themselves becomes noticeable as a particularly disturbing lack of color fidelity. Because these discrepancies are a maximum in connection with the signal amplitude in the dark areas of the picture, this color infidelity makes itself noticeable in a particularly disturbing manner in those areas.

Because television signals are, in general, transmitted by employing transmission means which do not allow the use of a direct current value, it is the practice when generating the television signals to insert into these signals a reference value, which has a definite ratio to the black level value, and which helps to recover the black value during the reproduction. In the conventional television standards, this reference value is the blanking value, which is transmitted during a time which begins somewhat prior to the horizontal and the vertical frequency flybacks, and terminates somewhat thereafter. For the purpose of obtaining this blanking value, certain measures are taken in both color television cameras and black and white cameras, which measures will be briefly described in the following. The scanning beam of the television camera tube is interrupted during the flybacks, whereby a pulse is established in the signal delivered by the camera tube, the amplitude value of which signal corresponds approximately to the black level in the camera tubes presently in use. Deviations from this can result from the so-called dark current of the camera tube. However, in some modern camera tubes, this dark current is so small that it can be ignored. Moreover, the compensation for this dark current, such as appears in a disturbing manner in other camera tubes, is not a part of the subject matter of the present invention.

The output signals from the camera tubes are accompanied by the above-named pulses, whose amplitude will be referred to in the following description as the provisional blanking value, and pass through a preamplifier to a clamping circuit. This clamping circuit, in general, is controlled by horizontal frequency pulses and brings the provisional blanking value up to a constant potential. After passing through this clamping circuit the signals are blanked out, that is to say they are short circuited, for example, for the duration of the blanking gap, and are therefore combined in a low ohmic manner with a constant potential. This constant potential is in a fixed relationship to the clamping potential. Between the clamping circuit and the blanking circuit there are situated transmission means, which also transmit the direct current component of the signal, and which, at the same time, are such as not to add to the signals any direct current components which are dependent on the temperature or other influences.

Due to imperfections in the said transmission means situated between the clamping circuit and the blanking circuit, and due also to errors in the clamping, it is possible for false black level signals and blanking signals to be established. These errors may, for example, be caused by disturbance signals appearing during the provisional blanking, which signals, or any disturbances otherwise occurring, superimpose themselves on the picture signal.

SUMMARY OF THE INVENTION

The purpose of the invention is to offer a method for regulating or supervising the black level value of the primary color signals, while avoiding the above-named disadvantages. The basic fact to be recognized is that the principal requirement is to remove differences between the black level values of the individual color signals.

The invention is characterized by the feature that the provisional blanking values of at least two primary color signals, derived by means of beam blanking in the camera tubes, are subtracted from each other or from a direct voltage, and that the differences are amplified and are indicated, or are used for regulation.

A further development of the invention provides that the respective two signals established in a color television signal generator, and the primary color signals corresponding to the three basic colors are delivered to the inputs of two differential amplifiers, respective gate circuits are connected to the output of each differential amplifier, said gate circuits being conductive during only a portion of that time in which the scanning beams of the camera tubes are blocked, the output of each of said gate circuits is connected to a respective storage device, which converts the pulses generated by the gate circuit into a respective regulating voltage, and the regulating voltages are delivered to clamping circuits, which are inserted in the paths of two primary color signals prior to the difference formation.

In a further development of the invention, which is particularly suited for subsequent connection to existing color television cameras, a special blanking pulse mixture is delivered to the color television camera, said mixture exhibiting, in addition to the usual horizontal frequency component, approximately two additional pulses, which appear during the forward traces of several lines after the vertical frequency blanking gaps. The primary color signals, thus provided with an additional blanking, can be indicated upon the screen of an oscillograph, so that a comparison may be made of the differences between the blanking values and the signal values derived by the additional beam blanking. However, according to a further development of the invention, it is also possible subsequently to correct the color value signals in respect of their blanking values.

BRIEF DESCRIPTION OF THE DRAWINGS

The invention will now be explained in more detail with reference to the accompanying drawings wherein.

Figure 1:
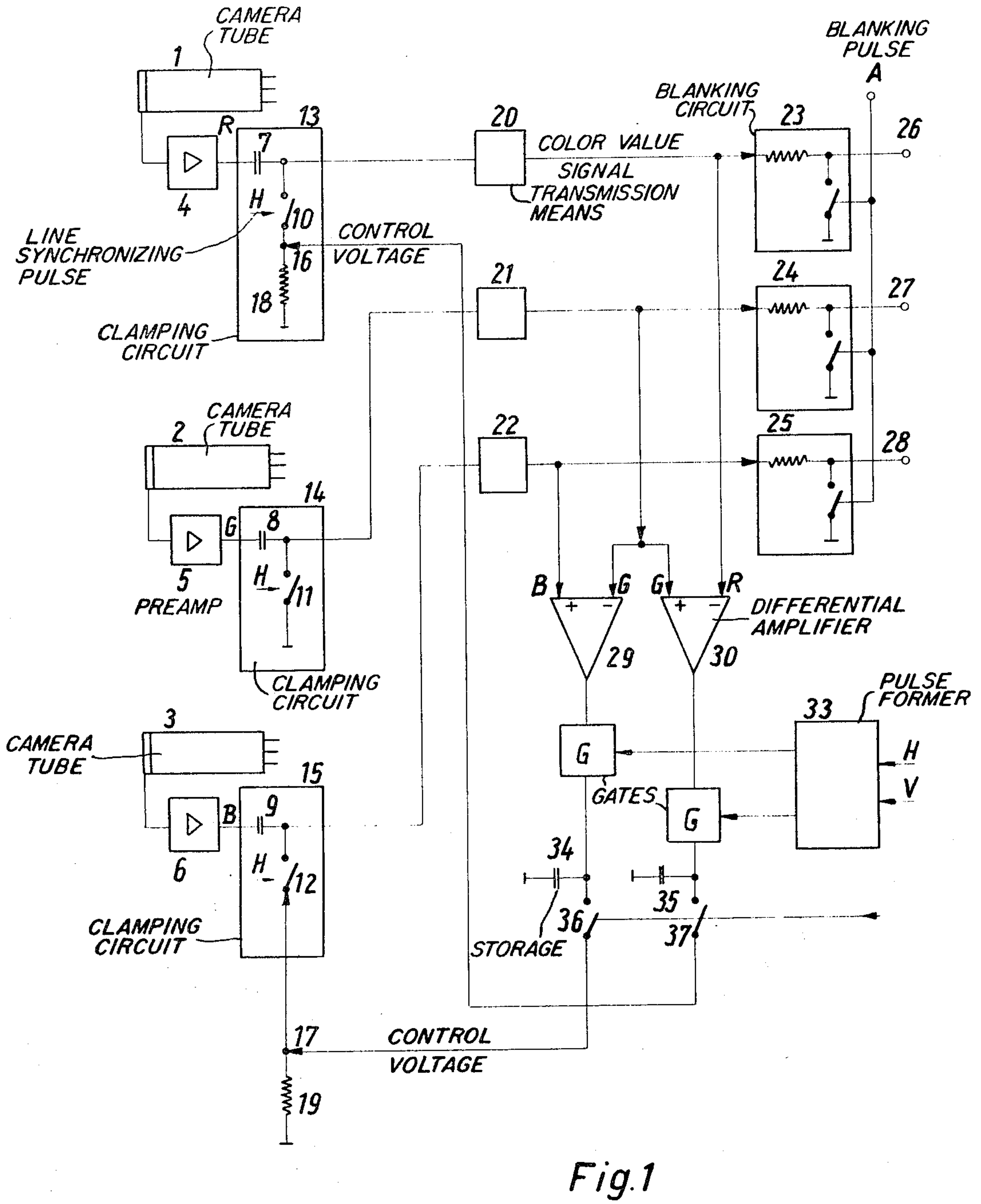
FIG. 1 is a schematic representation of a practical example of the invention.

FIGS. *2a–2c* is a voltage-time diagram of several pulses appearing in the arrangement according to FIG. 1.

Figure 3:
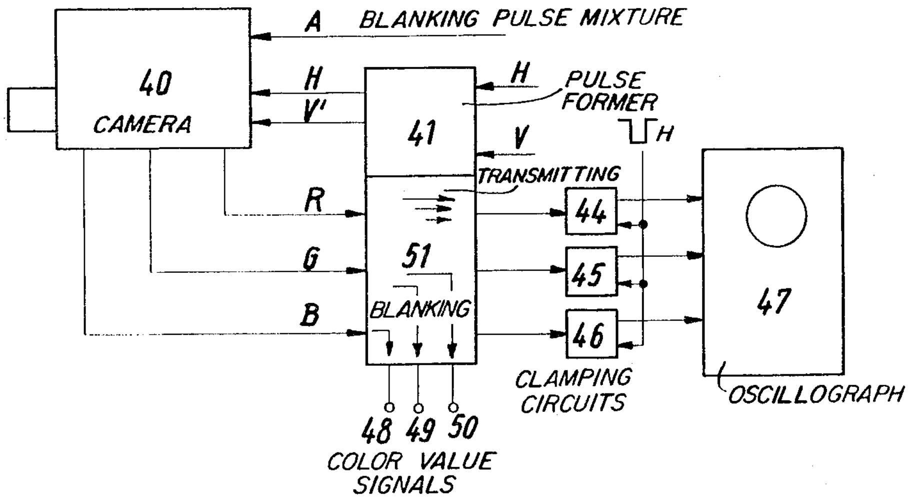

FIG. 3 is a schematic representation of a practical example according to another embodiment of the invention.

FIGS. *4a–4h* show voltage-time diagrams of pulses which appear in the arrangement according to FIG. 3.

DESCRIPTION OF THE PREFERRED EMBODIMENT

In FIG. 1, the references 1, 2 and 3 indicate the television camera tubes, such as are provided in a three-tube color television camera for producing the three primary color value signals. The output signals of tubes 1, 2 and 3 are amplified by preamplifiers 4, 5 and 6, and each amplified signal arrives at a respective clamping circuit comprising capacitors 7, 8, 9 and electronic switches 10, 11 and 12, which are controlled by the line synchronizing pulses. The clamping circuits, as such, are indicated respectively by 13, 14 and 15.

The clamping circuit 14, for example, clamps the provisional blanking value of the output signal of the camera tube 2 to a fixed potential, which, if required, can be adjusted manually. This latter feature is, however, not shown in the drawing for the sake of simplicity. The clamping potentials of the clamping circuits 13 and 15 can likewise be adjusted manually and can be further influenced by control voltages applied at points 16 and 17. For the sake of completeness there are shown in FIG. 1 further resistances 18 and 19, at which the respective control voltage has effect. By means of transmission means 20, 21 and 22, which may comprise a direct connected voltage amplifier having unity gain, the primary color value signals are taken to respective blanking circuits 23, 24, 25, which are controlled by a normalized blanking pulse A, and at whose output terminals 26, 27, and 28 the primary color value signals appear in the form of normalized FBA signals. At the same time the primary color value signals coming from the transmission means 20, 21 and 22 are delivered to the inputs of two differential amplifiers 29 and 30. These differential amplifiers form amplified signals respectively indicative of the difference between the signals R and G, and the difference between the signals G and B. At the outputs of the differential amplifiers are situated gate circuits, which only convey signals when they are switched into the conducting condition by a control voltage. Pulses for controlling the gate circuit are formed by the pulse former 33 from the pulses H and V (horizontal frequency and vertical frequency synchronizing pulses).

Figure 2B:
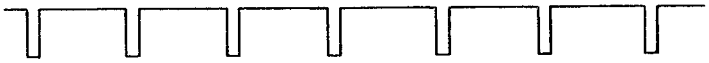
Figure 2A:
Figure 2C:

FIG. 2*a* shows the vertical frequency component of the blanking pulse mixture, and FIG. 2*b* shows horizontal frequency component of the blanking pulse mixture, which serves for beam blanking of the camera tube. The pulse-former 33 (FIG. 1) forms the pulses which are shown in FIG. 2*c* from the pulses according to FIGS. 2*a* and 2*b*. These pulses appear during the vertical blanking gaps, but nevertheless in the region of the horizontal frequency forward trace. During the time of these pulses the gate circuits 31 and 32 are conducting so that pulses are transmitted to the stores 34 and 35 (FIG. 1), the amplitudes of which pulses correspond to the differences between the provisional blanking values of the primary color value signals established at the inputs of the differential amplifiers 29 and 30. The stores 34 and 35 may, in the simplest case, comprise condensers, as is represented in FIG. 1. Thus, at the stores 34 and 35 control voltages appear, which represent the discrepancies of the provisional blanking values as between each other.

The control voltages are delivered to the points 16 and 17 of the clamping circuits 13 and 15, and control the clamping potential thereof in the sense of a reduction of the differences between the provisional blanking values of the primary color value signals. Because the color value signals are subsequently controlled to constant potential by the aid of the blanking circuits 23, 24 and 25, a stabilization of the black level values will also be effected by this means.

In the leads carrying the control voltage from the stores 34 and 35 to the clamping circuits, it is possible to introduce respective electronic switches 36 and 37, which are controlled by the horizontal frequency synchronizing pulses H.

Because only during the forward line trace is measurement made of the discrepancies between the provisional blanking values, any disturbance signals which take place in the line flybacks and are caused, for example, by the line deflection devices, are not detected by the measurement and cannot finally influence the black level value.

In accordance with the invention it is also possible to provide three differential amplifiers, of which each one has an input provided with a video signal and the other inputs are connected in common to a direct voltage. The output voltages of the three differential amplifiers are further treated in accordance with the circuit arrangement of FIG. 1. Such an arrangement is, in fact, more costly than an arrangement having two differential amplifiers, but has the advantage that an adjustment of the black level values in an equivalent sense can easily be performed by the direct voltage delivered to the differential amplifiers.

Figure 4A:
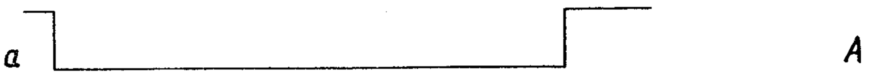
Figure 4B:
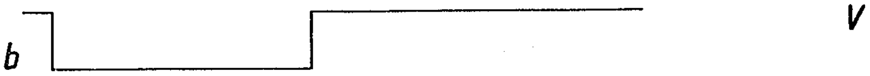
Figure 4C:
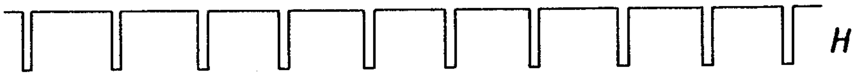

The circuit arrangement according to FIG. 1 is primarily suitable for incorporation into a color image signal generator, in particular a color television camera. The installation of this circuit arrangement in completed color television camera is quite difficult. However, these difficulties may be overcome by means of a further development of the invention. In the circuit arrangement according to FIG. 3, the color value signals R, G, B are generated in the color television camera 40. Of the pulses and voltages which are normally delivered to a color television camera, only the blanking pulse mixture A is illustrated in this case. Furthermore, there are delivered to the camera a horizontal frequency pulse H and a pulse V′ formed by the pulse former 41. The pulse mixture A is represented in FIG. 4*a*. FIGS. 4*b* and 4*c* show the pulses V and H which are delivered to the pulse-former 41 (FIG. 3).

Figure 4D:
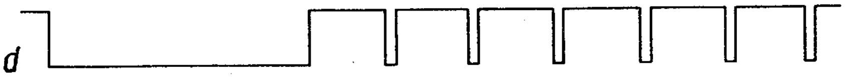
Figure 4E:
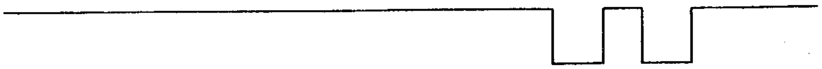
Figure 4F:
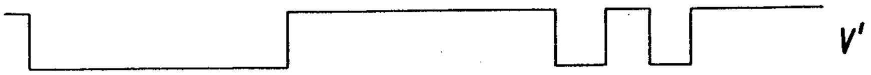
Figure 4G:
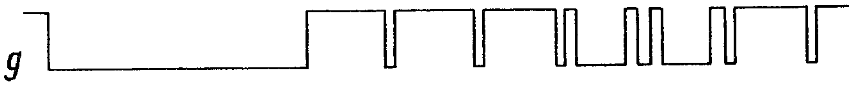

In known camera circuits the pulse mixture shown in FIG. 4*d* is composed of the pulses H and V, which pulse mixture serves for blanking the scanning beam. However, further pulses which are represented in FIG. 4*e* are added in the pulse former 41 to the pulse V. These pulses are situated in the line forward traces following upon the vertical blanking gaps (FIG. 4*a*). The sum of the pulses according to FIGS. 4*d* and 4*e* is shown in FIG. 4*f*. This sum of the pulses is delivered as a pulse mixture V′ to the camera, as are also the horizontal frequency pulses H which are shown in FIG. 4*c*, wherein the pulse mixture represented in FIG. 4*g* is produced for the purpose of blanking the electron beam.

Figure 4H:
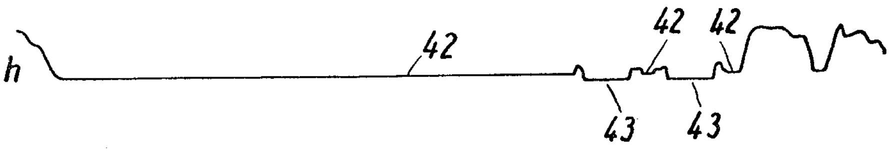

A section of the oscillogram of a desired one of the three color value signals R, G, B is shown in FIG. 4*h*. At the points on this voltage-time diagram indicated by the reference 42, the blanking value appears, which is held in the camera by known blanking circuits. During the line forward traces of the first lines after the vertical frequency blanking interval, that is to say at the places indicated by the reference 43, the color value signal assumes the provisional blanking value established by the blanking of the beam. The color value signals are, if required, delivered through clamping circuits 44, 45 and 46 (FIG. 3) to an oscillograph, 47 which possesses a plurality of signal inputs. By suitable adjustment of the time base and the deflection sensitivity of the oscillograph, the oscillograms of the three color value signals may be so represented that it will be possible to compare directly any discrepancies concerning the differences between the provisional blanking value and the actual blanking value. The color value signals are available for further use at the terminals 48, 49 and 50 (FIG. 3).

If the arrangement as described according to FIG. 3 in the foregoing is used for controlling the black level values, then there is situated in the device indicated by the reference 51 only a distribution device or, what may be desirable under certain circumstances, a device for blanking the lines indicated at 43 in FIG. 4*h*, but, which, is effective only for the outputs 48, 49, 50 and not for those outputs which are connected to the oscillograph 47. The clamping circuits 44, 45 and 46 can be introduced in order to avoid a repeated adjustment of the position of the oscillograph image in the vertical direction. To the clamping circuits there may be delivered both the horizontal frequency synchronizing pulses and the additional pulses according to FIG. 4*e*.

By means of the arrangement according to FIG. 3 it is also possible to effect an automatic regulation of the black level values of the color value signals, if the arrangement 51 is replaced by an arrangement corresponding to the circuit arrangement of FIG. 1. In such a case, as described in connection with FIG. 1, the differences between the provisional blanking values can then be measured and the final blanking values and the black level values can be readjusted.

The method according to the invention is not restricted only to the application to the camera described in the example as is represented in FIG. 1. It is possible with the same success to employ the method in conjunction with the amplifiers of other image signal generators, for example a film scanner, in which case this film scanner may not be fitted with image tubes, wherein the electron beam is interrupted by the blanking but may operate also, for example, with photo cells according to the so-called punctiform light scanning principle. In such a case it is more advantageous, under certain circumstances, to scan, not the cell, but the input stage of the signal amplifier in order to obtain the black reference signal. (provisional blanking).

What is claimed is:

1. In a color television system comprising tube means for generating color image signals including at least first and second primary color signals on separate lines, and a third signal source, said tube means using scanning beams which are periodically blocked, the improved means for controlling the black level of primary color signals comprising:

A. first and second differential amplifier means for respectively receiving said first and second primary color signals and respectively comparing the received signals with a third signal to derive first and second difference signals, B. first and second gate circuit means for respectively receiving said first and second difference signals for conducting said difference signals only during a portion of the time for which the scanning beams of the tube means are blocked, C. first and second storage devices for respectively receiving the first and second difference signals when the respective gates are conducting and for converting the gated difference signals respectively into first and second control voltages, and D. first and second clamping circuits respectively connected to said first and second storage devices and respectively to the differential amplifier means, and responsive to said first and second control voltages for clamping values of primary color signals in respective input paths of said differential amplifier means.

2. A system according to claim 1 further comprising means for applying to the gate circuit some pulses which occur during the vertical blanking gaps in the region of the horizontal forward trace.

3. A system according to claim 1 further comprising frequency component means for supplying horizontal and vertical frequency component, and means connected thereto for delivering a blanking pulse mixture to said tube means, said pulse mixture containing two additional pulses in addition to the usual horizontal frequency component and vertical frequency component.

4. A system according to claim 3 further comprising means for simultaneously applying to the inputs of an oscillograph the primary color signals from said tube means to produce an indication of the signal magnitudes on the screen, whereby the differences between the blanking values and the signal values for the primary color value signals can be seen.

5. A system according to claim 4 further comprising respective clamping circuits for delivering said primary color signals to the oscillograph.

6. A system according to claim 5 for applying to said clamping circuits pulses which appear during the blanking gaps and said additional pulses.

7. A system according to claim 3 wherein

A. said first and second clamping circuit means are connected to the separate lines and to the differential amplifier means to respectively receive said first and second primary color signals and for respectively applying first and second clamped signals to said first and second differential amplifier means, B. first and second blanking circuit means are respectively connected to the first and second clamping circuit means to receive and be controlled by said first and second clamped signals, and C. the outputs of said gate circuit means, appearing during said additional pulses, are connected to said storage devices and the storage devices are connected respectively with first and second clamping circuits whereby the clamping potential of the clamping circuits is regulated by feedback to reduce the differences between the blanking values of the primary color signals.

8. A system according to claim 1 wherein the third signal is a third color signal which is fed to the first and second differential amplifiers.

9. The system according to claim 1 further comprising a third differential amplifier receiving a third primary color value, and wherein the third signal is a constant signal fed to each of the differential amplifiers, and further comprising a third gate circuit means, a third storage device connected to the third gate circuit means and third clamping means connected to a third storage device and to a third primary color value source for clamping a gated and stored voltage onto the third primary color value.

10. The method for controlling the black level of primary colors signals derived from a plurality of color television cameras comprising: applying at least two primary color input signals respectively to two differential amplifiers, applying a third input signal to each of the differential amplifiers, periodically gating and storing the output signals of the differential amplifiers and continuously clamping each of primary color input signals of the differential amplifiers to both the respective output signal of each differential amplifier and another clamping signal, periodically blanking the color signals and transmitting the composite periodically blanked color signals.

* * * * *